US010250866B1

(12) United States Patent
Jenny (10) Patent No.: US 10,250,866 B1
(45) Date of Patent: Apr. 2, 2019

(54) SYSTEMS AND METHODS FOR CAPTURING LIGHT FIELD OF OBJECTS (71) Applicant: GOPRO, INC., San Mateo, CA (US)

(72) Inventor: Alexandre Jenny, Challes les eaux (FR)

(73) Assignee: GoPro, Inc., San Mateo, CA (US)

( * ) Notice: Subject to any disclaimer, the term of this patent is extended or adjusted under 35 U.S.C. 154(b) by 113 days.

(21) Appl. No.: 15/387,477

(22) Filed: Dec. 21, 2016

(51) Int. Cl.
*H04N 5/265* (2006.01)
*H04N 13/243* (2018.01)

(52) U.S. Cl.
CPC ........... *H04N 13/243* (2018.05); *H04N 5/265* (2013.01)

(58) Field of Classification Search
CPC ... H04N 13/243; H04N 13/0242; H04N 5/265
See application file for complete search history.

(56) References Cited

U.S. PATENT DOCUMENTS

| 6,243,099 | B1 | 6/2001 | Oxaal |
| 9,264,598 | B1 | 2/2016 | Baldwin |
| 9,609,212 | B2 | 3/2017 | Takenaka |
| 2008/0074500 | A1 | 3/2008 | Chen |
| 2009/0010567 | A1 | 1/2009 | Akiba |
| 2010/0097444 | A1 | 4/2010 | Lablans |
| 2011/0063421 | A1 | 3/2011 | Kubota |
| 2011/0115806 | A1 | 5/2011 | Rogers |
| 2011/0168475 | A1 | 7/2011 | Moser |
| 2011/0249001 | A1 | 10/2011 | Kameyama |
| 2011/0255802 | A1 | 10/2011 | Kameyama |
| 2013/0013185 | A1 | 1/2013 | Smitherman |
| 2013/0100132 | A1 | 4/2013 | Katayama |
| 2015/0173715 | A1 | 6/2015 | Raghavan |
| 2016/0189434 | A1* | 6/2016 | Fong ................. G06T 19/20 345/633 |
| 2016/0307372 | A1* | 10/2016 | Pitts .................... H04N 5/2254 |

* cited by examiner

*Primary Examiner* — Christopher S Kelley
*Assistant Examiner* — Nasim N Nirjhar
(74) *Attorney, Agent, or Firm* — Esplin & Associates, PC (57) ABSTRACT

A set of light field sensors may generate light field output signals conveying light field information within fields of view of the set of light field sensors. The generation of the light field outputs signals may be characterized by a subpixel accuracy. The subpixel accuracy may be enabled by a physical link between the set of light field sensors. The fields of view of the set of light field sensors may overlap over an overlap volume. An object may be located within the overlap volume. The light field information characterizing light field emanating from the object may be combined.

20 Claims, 5 Drawing Sheets

SYSTEMS AND METHODS FOR CAPTURING LIGHT FIELD OF OBJECTS

FIELD

This disclosure relates to systems and methods that capture light field of objects.

BACKGROUND

Capturing light field of a view may enable viewing of light field images for the view. Light field images may be manipulated using information from captured light field. For example, focus and/or parallax within light field images may be altered.

SUMMARY

This disclosure relates to capturing light field of objects. A set of light field sensors may generate light field output signals conveying light field information within fields of view of the set of light field sensors. The generation of the light field outputs signals may be characterized by a subpixel accuracy. The subpixel accuracy may be enabled by a physical link between the set of light field sensors. The fields of view of the set of light field sensors may overlap over an overlap volume. An object may be located within the overlap volume. The light field information characterizing light field emanating from the object may be combined.

A system that captures light field of objects may include a set of light field sensor, one or more processors, and/or other components. Light field may refer to light rays at multiple points in space traveling in multiple directions. A light field sensor may include one or more microlens arrays that split up light rays before the light rays are captured by the light field sensor. Light field sensors may capture light rays' color, intensity, angular directions, and/or other information.

A set of light field sensors may be configured to generate light field output signals. The generation of the light field output signals by the set of light field sensors may be characterized by a subpixel accuracy. The subpixel accuracy may be enabled by a physical link between the set of light field sensors. Light field output signals may convey light field information within fields of view of the set of light field sensors. The fields of view may overlap over an overlap volume.

A set of light field sensors may include multiple light field sensors. In some implementations, the set of light field sensors may be arranged in a spherical configuration. In some implementations, the set of light field sensors may be arranged in a polyhedron configuration. In some implementations, the set of light field sensors may be arranged in a cubic configuration.

The set of light field sensors may include a first light field sensor, a second light field sensor, and/or other light field sensors. The first light field sensor may be configured to generate first light field output signals. The first light field output signals may convey first light field information within a first field of view. The second light field sensor may be configured to generate second light field output signals. The second light field output signals may convey second light field information within a second field of view. The first field of view and the second field of view may overlap over the overlap volume.

The processor(s) may be configured by machine-readable instructions. Executing the machine-readable instructions may cause the processor(s) to facilitate capturing light field of objects. The machine-readable instructions may include one or more computer program components. The computer program components may include one or more of a light field information component, a combination component, and/or other computer program components. In some implementations, the computer program components may include a presentation component.

The light field information component may be configured to obtain one or more object light field information based on one or more light field information and/or other information. The object light field information may characterize light field emanating from an object located within the overlap volume. In some implementations, the object located within the overlap volume may include a moving object. The light field information component may obtain first object light field information based on the first light field information. The first object light field information may characterize first light field emanating from the object located within the overlap volume. The light field information component may obtain second object light field information based on the second light field information. The second object light field information may characterize second light field emanating from the object located within the overlap volume.

The combination component may be configured to generate a combined object light field information based on multiple object light field information and/or other information. The combination component may generate the combined object light field information based on the first object light field information and the second object light field information. In some implementations, the combined object light field information may characterize 360 degrees of light field emanating from the object located within the overlap volume.

The presentation component may be configured to present one or more views of the object on a display. One or more views of the object may be presented based on the combined object light field information and/or other information. In some implementations, presenting one or more views of the object may include determining one or more locations of view for the object. One or more views of the object may be determined based on one or more locations of view for the object, the combined object light field information, and/or other information. In some implementations, the view of the object may be presented on the display without a use of a point cloud or a texture.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
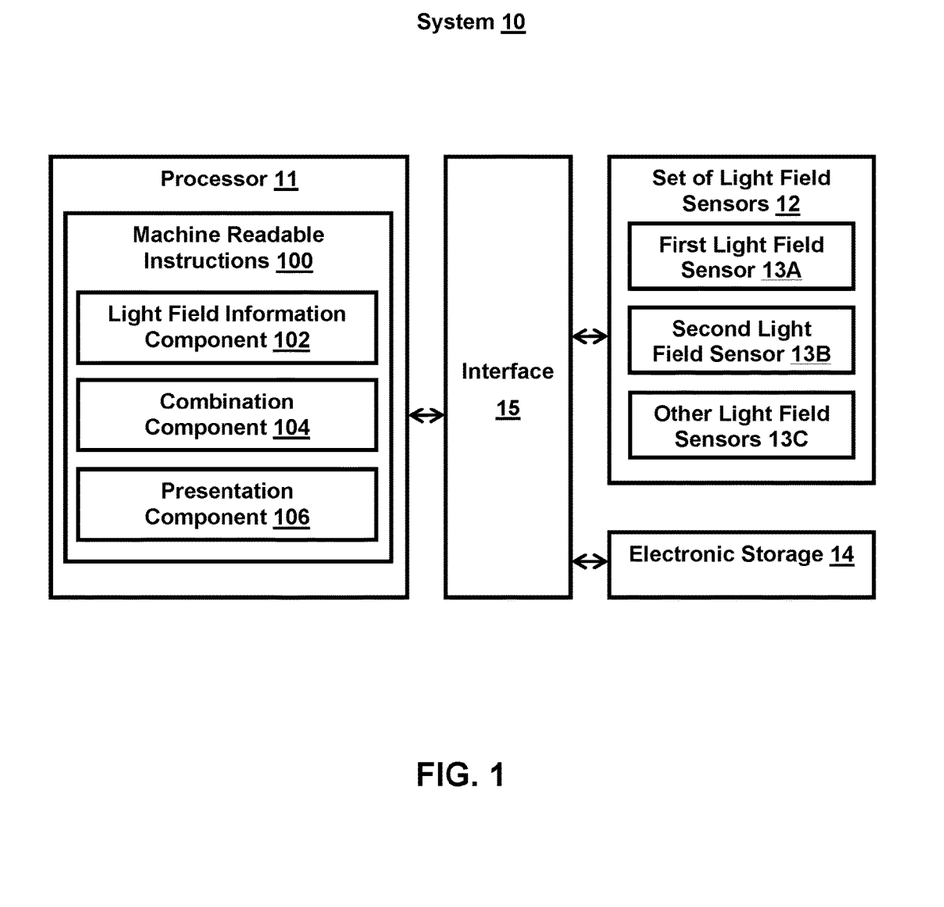
FIG. 1 illustrates a system that captures light field of objects.

FIG. 1 illustrates system 10 for capturing light field of objects. System 10 may include one or more of processor 11, set of light field sensors 12 (including first light field sensor 13A, second light field sensor 13B, and/or other light field sensors 13C), electronic storage 14, interface 15 (e.g., bus, wireless interface), and/or other components. Set of light field sensors 12 may generate light field output signals conveying light field information within fields of view of set of light field sensors 12. The generation of the light field outputs signals may be characterized by a subpixel accuracy. The subpixel accuracy may be enabled by a physical link between set of light field sensors 12. The fields of view of set of light field sensors 12 may overlap over an overlap volume. An object may be located within the overlap volume. The light field information characterizing light field emanating from the object may be combined.

Light field may refer to light rays at multiple points in space traveling in multiple directions. A light field sensor may refer to one or more sensors that may capture light field. A light field sensor may include one or more microlens arrays that split up light rays before the light rays are captured by the light field sensor. A light field sensor may capture light rays' color, intensity, angular directions, and/or other information. Light field information may include light rays' color, intensity, angular directions, and/or other information. Capturing light field of a view may allow for presentations of images of the view with color and depth.

Set of light field sensors 12 may include multiple light field sensors. Set of light field sensors 12 may be configured to generate light field output signals. Light field output signals may convey light field information within fields of view of set of light field sensors 12. The fields of view may overlap over an overlap volume. One or more objects (e.g., living/non-living subjects/things) may be located within the overlap volume. The generation of the light field output signals by set of light field sensors 12 may be characterized by a subpixel accuracy. The subpixel accuracy may be enabled by a physical link between set of light field sensors 12. In some implementations, the generation of the light field output signals by set of light field sensors 12 may be characterized by a two nanosecond sync.

For example, referring to FIG. 1, set of light field sensors 12 may include first light field sensor 13A, second light field sensor 13B, and/or other light field sensors 13C. First light field sensor 13A may be configured to generate first light field output signals. First light field output signals may convey first light field information within a first field of view. Second light field sensor 13B may be configured to generate second light field output signals. Second light field output signals may convey second light field information within a second field of view. Other light field sensors 13C may be configured to generate other light field output signals. Other light field output signals may convey other light field information within other fields of view. Multiple fields of view of individual light field sensors (e.g., 13A, 13B, 13C) may overlap over an overlap volume. The generation of the light field output signals by light field sensors 13A, 13B, 13C may be characterized by a subpixel accuracy. The subpixel accuracy may be enabled by a physical link between light field sensors 13A, 13B, 13C.

Figure 3:
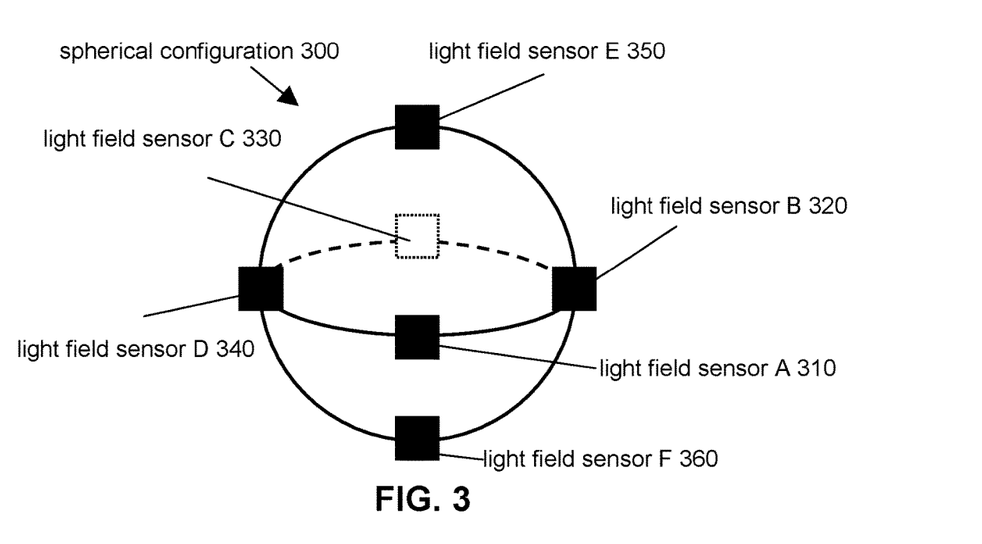
FIG. 3 illustrates an exemplary spherical configuration for a set of light field sensors.

In some implementations, set of light field sensors 12 may be arranged in a spherical configuration. Set of light field sensors 12 arranged in a spherical configuration may include light field sensors that are positioned relative to each other so that their positions form a sphere. Set of light field sensors 12 arranged in a spherical configuration may include light field sensors that are positioned on the "surface" of the sphere. FIG. 3 illustrates an exemplary spherical configuration 300 for set of light field sensors 12. Set of light field sensors 12 may include light field sensor A 310, light field sensor B 320, light field sensor C 330 (shown in dotted line to indicate position on far side of spherical configuration 300), light field sensor D 340, light field sensor E 350, light field sensor F 360, and/or other light field sensors. Light field sensor A 310, light field sensor B 320, light field sensor C 330, light field sensor D 340, light field sensor E 350, light field sensor F 360, and/or other light field sensors may be positioned relative to each other so that their positions form spherical configuration 300. Light field sensor A 310, light field sensor B 320, light field sensor C 330, light field sensor D 340, light field sensor E 350, light field sensor F 360, and/or other light field sensors may be positioned on the "surface" of spherical configuration 300.

Figure 4:
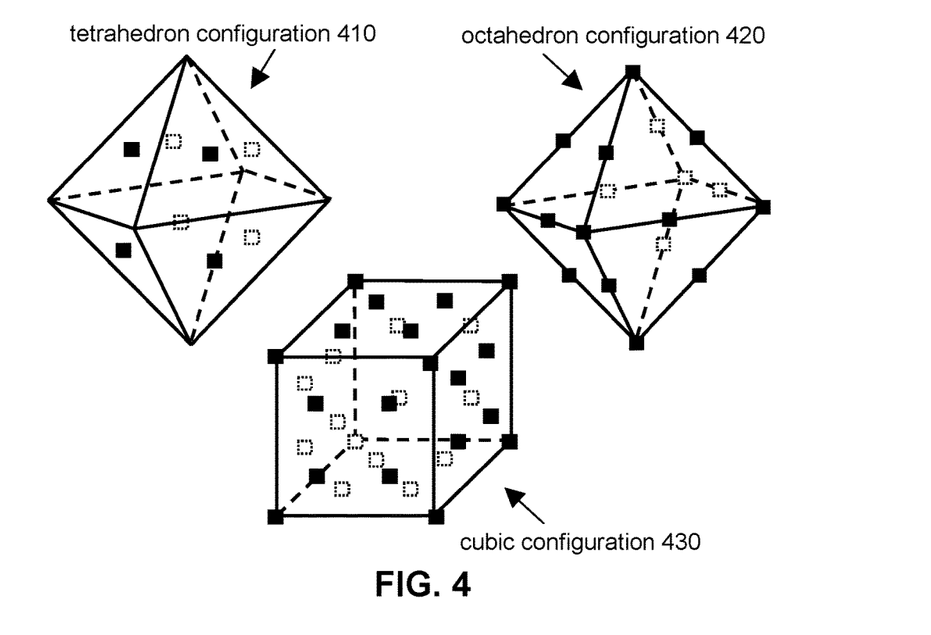
FIG. 4 illustrates exemplary polyhedron configurations for a set of light field sensors.

In some implementations, set of light field sensors 12 may be arranged in a polyhedron configuration. Set of light field sensors 12 arranged in a polyhedron configuration may include light field sensors that are positioned relative to each other so that their positions form a polyhedron (e.g., tetrahedron, cube, octahedron, dodecahedron, icosahedron). The polyhedron may include regular polyhedron or irregular polyhedron. Set of light field sensors 12 arranged in a polyhedron configuration may include light field sensors that are positioned on the "surface," "edges," and/or "corners," of the polyhedron. FIG. 4 illustrates exemplary polyhedron configurations for set of light field sensors 12. Tetrahedron configuration 410 may include set of light field sensors 12 arranged on surfaces of a tetrahedron. Octahedron configuration 420 may include set of light field sensors 12 arranged on edges and corners of octahedron. Cubic configuration 430 may include set of light field sensors 12 arranged on surfaces and corners of a cube. Other arrangements of set of light field sensors 12 are contemplated.

Set of light field sensors 12 may be arranged so that the light field sensors capture reverse panorama of an object. Set of light field sensors 12 may be arranged so that the fields of view of light field sensors include an object and set of light field sensors 12 capture light field emanating from the object. Light field captured by the light field sensors may be combined/stitched together to form a three-dimensional light field of the object. Light field may be combined/stitched together based on correlation of the light field sensors, geometric registration of the light field sensors, photometric registration of the light field sensor, and/or blending/rendering to the final destination.

Figure 5A:
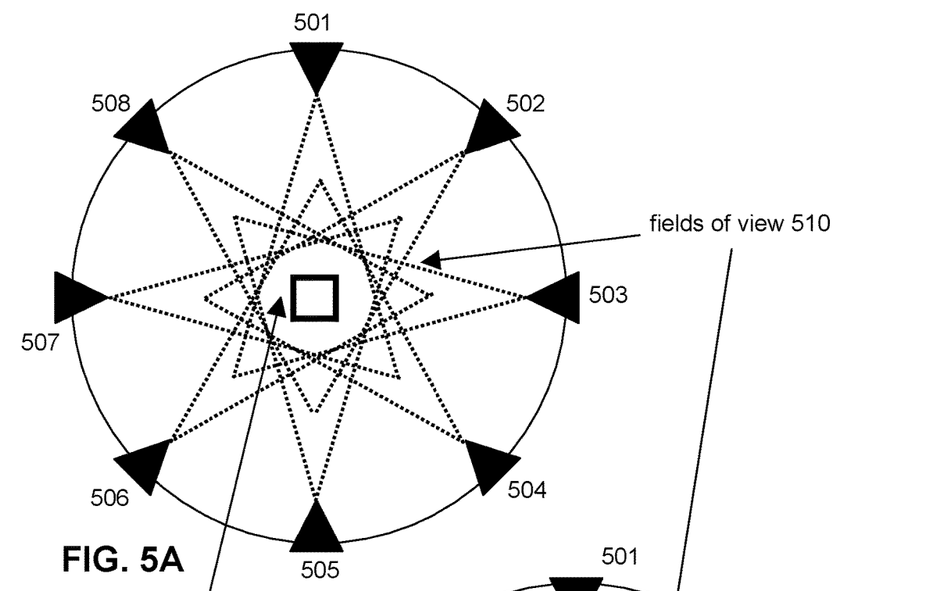
FIGS. 5A-5B illustrate exemplary fields of view for sets of light field sensors.
Figure 5B:
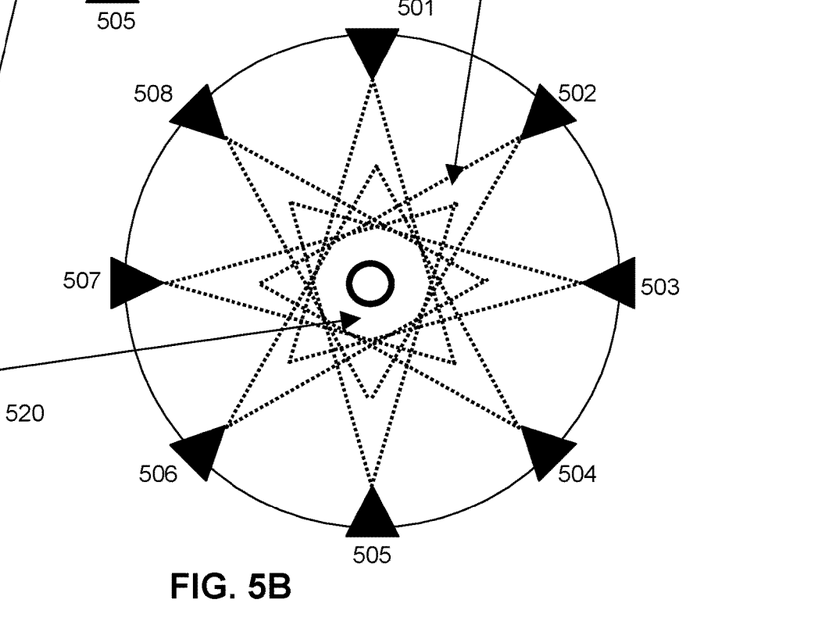

For example, FIGS. 5A-5B illustrate exemplary fields of view for light field sensors 501, 502, 503, 504, 505, 506, 507, 508. Light field sensors 501, 502, 503, 504, 505, 506, 507, 508 shown in FIGS. 5A-5B may include eight of set of light field sensors 12 arranged in a spherical configuration (e.g., spherical configuration 300). For example, light field sensors 501, 502, 503, 504, 505, 506, 507, 508 may include set of light field sensors 12 arranged around equator line of spherical configuration 300. Light field sensors 501, 502, 503, 504, 505, 506, 507, 508 may include fields of view 510. Fields of view 510 may overlap over overlap volume 520. Overlap volume 520 may approximate a smaller sphere inside spherical configuration 300. Over shapes of overlap volume are contemplated.

An object may be located within overlap volume 520. For example, overlap volume 520 in FIG. 5A may include a cube-shaped object and overlap volume 520 in FIG. 5B may include a sphere-shaped object. In some implementations, the object located within overlap volume may be moving. For example, a cube-shaped object (e.g., shown in FIG. 5A) may be spinning, changing its position, and/or changing its shape (e.g., to a sphere as shown in FIG. 5B). Other movements of objects are contemplated.

Electronic storage 14 may be configured to include electronic storage medium that electronically stores information. Electronic storage 14 may store software algorithms, information determined by processor 11, information received remotely, and/or other information that enables system 10 to function properly. For example, electronic storage 14 may store information relating to light field sensors, fields of view, overlap volume, light field output signals, light field information, object light field information, combined object light field information, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate capturing light field of objects. Machine readable instructions 100 may include one or more computer program components. Machine readable instructions 100 may include one or more of light field information component 102, combination component 104, and/or other computer program components. In some implementations, machine readable instructions 100 may include presentation component 106.

Light field information component 102 may be configured to obtain one or more object light field information based on one or more light field information and/or other information. The object light field information may characterize light field emanating from an object located within the overlap volume. For example, referring to FIG. 5A, light field sensors 501, 502, 503, 504, 505, 506, 507, 508 may generate light field output signals conveying light field information within fields of view 510 of light field sensors 501, 502, 503, 504, 505, 506, 507, 508. Light field sensor 501 may generate first light field output signals conveying light field information within its field of view, light field sensor 502 may generate second light field output signals conveying light field information within its field of view, and so forth.

Light field information component 102 may obtain object light field information based on the light field information (e.g., conveyed within light field output signals generated by light field sensors 501, 502, 503, 504, 505, 506, 507, 508). For example, light field information component 102 may obtain first object light field information based on the light field information conveyed by the first light field output signals, obtain second object light field information based on the light field information conveyed by the second light field output signals, and so forth. The first object light field information, the second object light field information, and/or other object light field information may characterize light field emanating from the object located within overlap volume 520. Light field information component 102 may distinguish light field emanating from the object (e.g., cube) located within overlap volume 520 from other light field emanating from other objects based on light rays' color, intensity, angular directions, and/or other information. For example, light field information component 102 may distinguish light field emanating from the cube-shaped object from light field emanating from other objects based on depth information (e.g., where light ray originated).

In some implementations, the object located within the overlap volume may include a moving object. For example, a cube-shaped object (e.g., shown in FIG. 5A) may be spinning, changing its position, and/or changing its shape to a sphere (e.g., shown in FIG. 5B). Object light field information may characterize light field emanating from the object as it moves within overlap volume 520.

Combination component 104 may be configured to generate a combined object light field information based on multiple object light field information and/or other information. The combined object light field information may characterize 360 degrees of light field emanating from the object located within the overlap volume. For example, combination component 104 may generate the combined object light field information based on the first object light field information, the second object light field information, and/or other object light field information obtained based on light field information from light field sensors 501, 502, 503, 504, 505, 506, 507, 508.

The combined object light field information may characterize 360 degrees of light field emanating from the cube-shaped object located within overlap volume 520. Combination component 104 may be configured to generate a combined object light field information by combining/stitching different light rays captured by different light field sensors. Light rays may be combined/stitched together to form a three-dimensional light field of the object. Light rays may be combined/stitched together based on correlation of the light field sensors, geometric registration of the light field sensors, photometric registration of the light field sensor, and/or blending/rendering to the final destination. Combination/stitching of the light rays may be enabled by the subpixel accuracy of the light field output signals generation. The subpixel accuracy may be enabled by a physical link between the set of light field sensors (e.g., light field sensors 501, 502, 503, 504, 505, 506, 507, 508). The generation of the light field output signals by the set of light field sensors may be characterized by a two nanosecond sync.

Presentation component 106 may be configured to present one or more views of the object on a display. One or more views of the object may be presented based on the combined object light field information and/or other information. For example, the three-dimensional light field of an object may be used for virtual reality cinematography. How an object may look within a virtual scene may be determined based on the three-dimensional light field of the object.

Presenting one or more views of the object based on the combined object light field information may include determining one or more locations of view for the object. A location of view may refer to a location from which the object may be seen. The location of view may be changed to simulate changes in view of the object (e.g., moving around while looking at the virtual object in virtual reality cinematography). One or more views of the object may be determined based on one or more locations of view for the object, the combined object light field information, and/or other information.

Figures 6A, 6B:
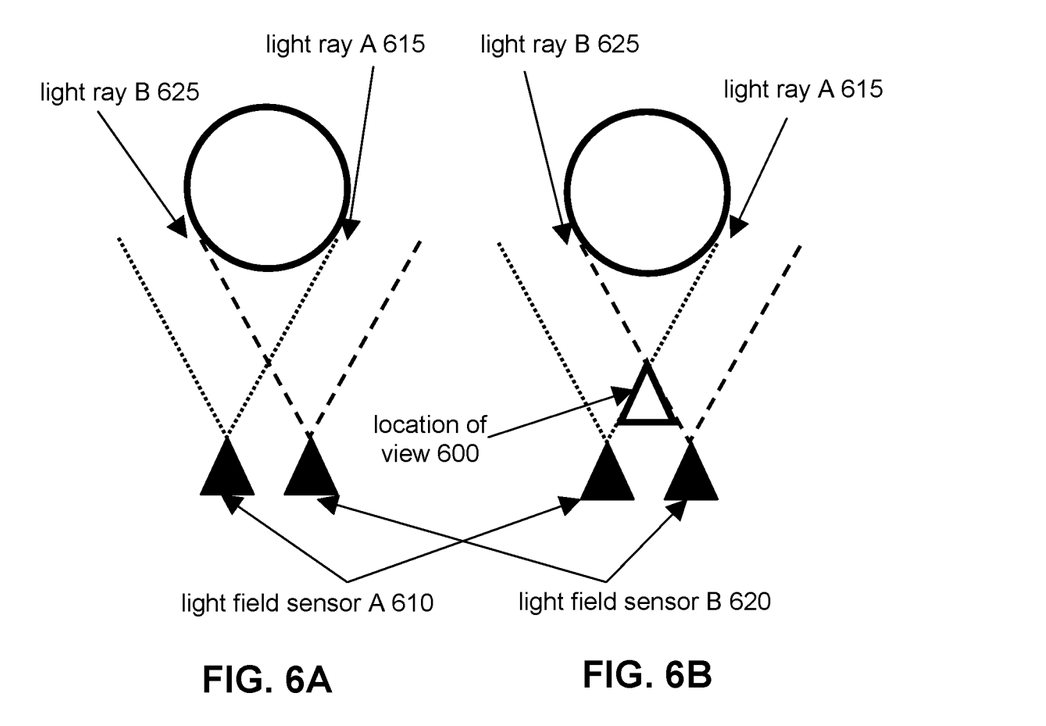
FIGS. 6A-6B illustrate exemplary light rays captured by light field sensors.

A location of view may be located at one or more positions of light field sensors. For example, referring to FIG. 6A, a location of view may be located at positions of light field sensor A 610, light field sensor B 620, and/or other light field sensors. A location of view may not be located at one or more positions of light field sensors. For example, referring to FIG. 6B, location of view 600 may be located at a position in front of and between light field sensor A 610 and light field sensor 620.

Using a location of view (e.g., location of view 600) not located at one or more positions of light field sensors may effectuate a view of the object from a "virtual" camera. The view of the virtual camera may be determined based right rays captured by different light field sensors. For example, referring to FIG. 6A, combined object light field information may include information relating to light ray A 615, light ray B 625, and/or other light rays. Light ray A 615 may have originated from the right side of the circular object and have been captured by light field sensor A 610. Light ray B 625 may have originated from the left side of the circular object and have been captured by light field sensor B 620.

Figure 6C:
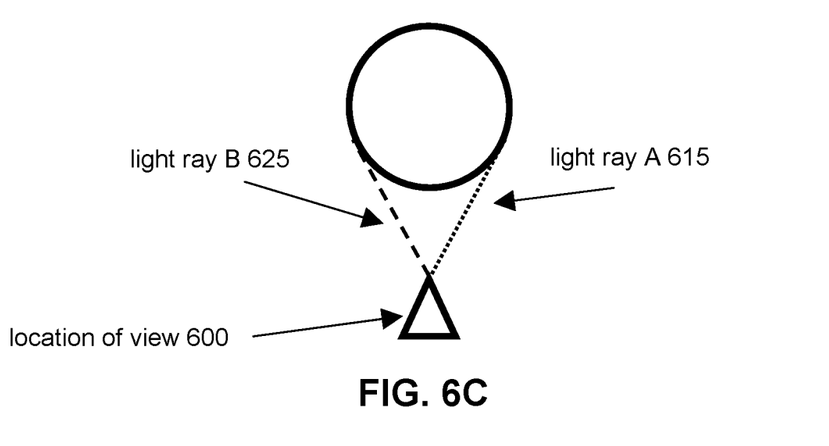
FIG. 6C illustrates exemplary light rays used to present a view of an object from a location.

A view of the circular object may be determined based on location of view 600 and the combined object light field information for the circular object. For example, referring to FIG. 6C, a view of the right side of the circular object from location of view 600 may be determined based on light ray A 615 (captured by light field sensor A 610) and a view of the left side of the circular object from location of view 600 may be determined based on light ray B 625 (captured by light field sensor B 620). Determining a view of the object may include light field warping and/or transformation to determine how the object would look from a location that does not coincide with a location of a light field sensor.

The view of the object may be presented on the display without a use of a point cloud or a texture. For example, the view of the circular object shown in FIG. 6C may be displayed using a display that presents light field of an object (e.g., a head-mounted visor that displays light field). The view of the object may be changed based on how the user changes the view of the object (e.g., moving in a lateral/vertical direction, changing the orientation of the head). Presentation of light field may enable viewing of an object without the use of a point cloud or a texture for the object. Presenting a view of an object using point clouds and/or texture may require construction and rendering of an object with polygons and polygon textures. Constructing and rendering a complicated object may require a high amount of resources (e.g., time, processing power, storage space). Use of light field to present a view of an object may enable a presentation of the object without the use of a point cloud/texture and increase the speed with which a view of the object may be presented.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 14 are shown to be connected to interface 15 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 14. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, and/or 106 may be eliminated, and some or all of its functionality may be provided by other computer program components. As another example, processor 11 may be configured to execute one or more additional computer program components that may perform some or all of the functionality attributed to one or more of computer program components 102, 104, and/or 106 described herein.

The electronic storage media of electronic storage 14 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 14 may be a separate component within system 10, or electronic storage 14 may be provided integrally with one or more other components of system 10 (e.g., processor 11). Although electronic storage 14 is shown in FIG. 1 as a single entity, this is for illustrative purposes only. In some implementations, electronic storage 14 may comprise a plurality of storage units. These storage units may be physically located within the same device, or electronic storage 14 may represent storage functionality of a plurality of devices operating in coordination.

Figure 2:
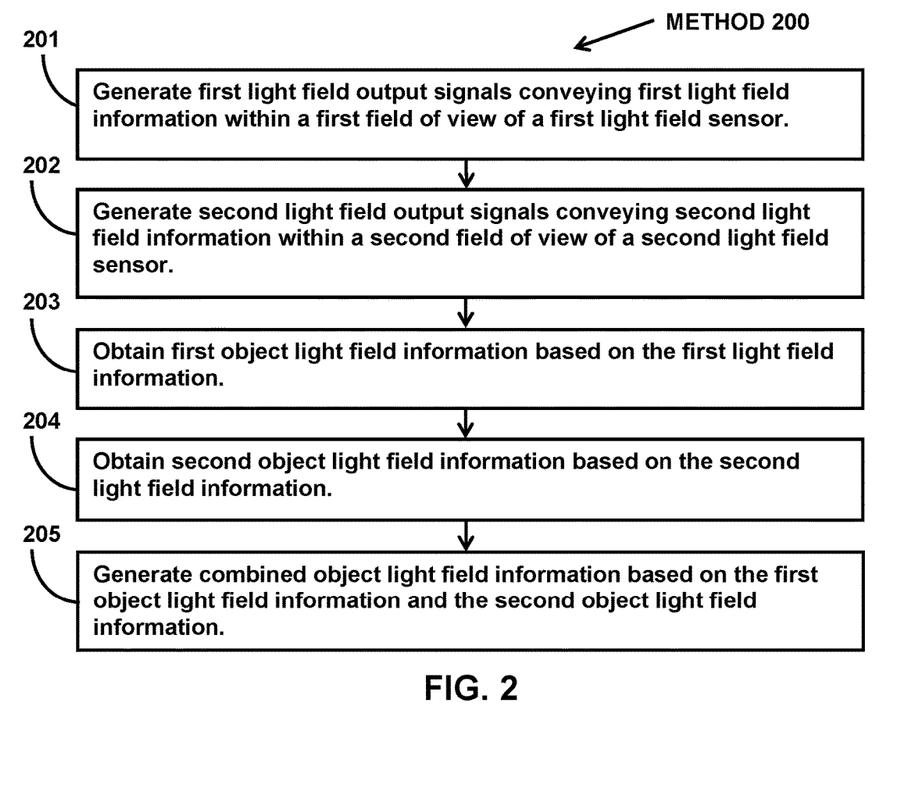
FIG. 2 illustrates a method for capturing light field of objects.

FIG. 2 illustrates method 200 for capturing light field of objects. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, first light field output signals may be generated. The first light field output signals may convey first light field information within a first field of view of a first light field sensor. In some implementation, operation 201 may be performed by one or more sensors the same as or similar to first light field sensor 13A (Shown in FIG. 1 and described herein).

At operation 202, second light field output signals may be generated. The second light field output signals may convey second light field information within a second field of view of a second light field sensor. The first field of view and the second field of view may overlap over an overlap volume. In some implementation, operation 202 may be performed by one or more sensors the same as or similar to second light field sensor 13B (Shown in FIG. 1 and described herein).

At operation 203, first object light field information may be obtained based on the first light field information. The first object light field information may characterize first light field emanating from an object located with the overlap volume. In some implementations, operation 203 may be performed by a processor component the same as or similar to light field information component 102 (Shown in FIG. 1 and described herein).

At operation 204, second object light field information may be obtained based on the second light field information. The second object light field information may characterize second light field emanating from the object located with the overlap volume. In some implementations, operation 204 may be performed by a processor component the same as or similar to light field information component 102 (Shown in FIG. 1 and described herein).

At operation 205, a combined object light field information may be generated based on the first object light field information and the second object light field information. In some implementations, operation 205 may be performed by a processor component the same as or similar to combination component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for capturing light field of objects, the system comprising:
   a set of light field sensors configured to generate light field output signals conveying light field information within fields of view of the set of light field sensors, the fields of view of the set of light field sensors inwardly directed such that the fields of view overlap over an overlap volume, the set of light field sensor surrounding the overlap volume, the generation of the light field output signals by the set of light field sensors characterized by a subpixel accuracy, the subpixel accuracy enabled by a physical link between the set of light field sensors, wherein the set of light field sensors includes:
   a first light field sensor configured to generate first light field output signals conveying first light field information within a first field of view; and
   a second light field sensor configured to generate second light field output signals conveying second light field information within a second field of view; and one or more physical processors configured by machine-readable instructions to:
   obtain first object light field information based on the first light field information, the first object light field information characterizing first light field emanating from an object entirely located within the overlap volume, wherein the first object light field information is determined based on distinguishing the first light field emanating from the object from other light field emanating from one or more other objects;
   obtain second object light field information based on the second light field information, the second object light field information characterizing second light field emanating from the object entirely located within the overlap volume;
   generate a combined object light field information based on the first object light field information and the second object light field information; and
   present a view of the object on a display based on the combined object light field information, wherein presenting the view of the object on the display includes:
   determining a location of view for the object; and
   determining the view of the object based on the location of view for the object and the combined object light field information.

2. The system of claim 1, wherein the view of the object is presented on the display without a use of a point cloud or a texture.

3. The system of claim 1, wherein the set of light field sensors are arranged in a spherical configuration.

4. The system of claim 1, wherein the set of light field sensors are arranged in a polyhedron configuration.

5. The system of claim 1, wherein the set of light field sensors are arranged in a cubic configuration.

6. The system of claim 1, wherein the combined object light field information characterizes 360 degrees of light field emanating from the object entirely located within the overlap volume.

7. The system of claim 1, wherein:
the object includes a moving object;
the first object light field information characterizes the first light field emanating from the moving object; and
the second object light field information characterizes the second light field emanating from the moving object.

8. A method for capturing light field of objects, the method comprising:
generating light field output signals conveying light field information within fields of view of a set of light field sensors, the fields of view of the set of light field sensors inwardly directed such that the fields of view overlap over an overlap volume, the set of light field sensor surrounding the overlap volume, the generation of the light field output signals characterized by a subpixel accuracy, the subpixel accuracy enabled by a physical link between the set of light field sensors, wherein generating the light field output signals includes:
generating first light field output signals conveying first light field information within a first field of view of a first light field sensor; and
generating second light field output signals conveying second light field information within a second field of view of a second light field sensor;
obtaining first object light field information based on the first light field information, the first object light field information characterizing first light field emanating from an object entirely located within the overlap volume, wherein the first object light field information is determined based on distinguishing the first light field emanating from the object from other light field emanating from one or more other objects;
obtaining second object light field information based on the second light field information, the second object light field information characterizing second light field emanating from the object entirely located within the overlap volume;
generating a combined object light field information based on the first object light field information and the second object light field information; and
presenting a view of the object on a display based on the combined object light field information, wherein presenting the view of the object on the display includes:
determining a location of view for the object; and
determining the view of the object based on the location of view for the object and the combined object light field information.

9. The method of claim 8, wherein the view of the object is presented on the display without a use of a point cloud or a texture.

10. The method of claim 8, wherein the set of light field sensors are arranged in a spherical configuration.

11. The method of claim 8, wherein the set of light field sensors are arranged in a polyhedron configuration.

12. The method of claim 8, wherein the set of light field sensors are arranged in a cubic configuration.

13. The method of claim 8, wherein the combined object light field information characterizes 360 degrees of light field emanating from the object entirely located within the overlap volume.

14. The method of claim 8, wherein:
the object includes a moving object;
the first object light field information characterizes the first light field emanating from the moving object ; and
the second object light field information characterizes the second light field emanating from the moving object.

15. The system of claim 1, wherein:
the first light field sensor is positioned to left of the second light field sensor;
the location of view for the object is positioned in between and front of the first light field sensor and the second light field sensor;
the view of the object is determined without use of a point cloud or a texture of the object and based on:
a first light ray emanating from a right side of the object, the first light ray captured by the first light field sensor; and
a second light ray emanating from a left side of the object, the second light ray captured by the second light field sensor.

16. The system of claim 1, wherein the first light field emanating from the object is distinguished from the other light field emanating from the one or more other objects based on colors, intensities, or angular directions of light rays within the first light field and the other light field.

17. The system of claim 1, wherein the first light field emanating from the object is distinguished from the other light field emanating from the one or more other objects based on locations of origination of the first light field and the other light field.

18. The method of claim 8, wherein:
the first light field sensor is positioned to left of the second light field sensor;
the location of view for the object is positioned in between and front of the first light field sensor and the second light field sensor;
the view of the object is determined without use of a point cloud or a texture of the object and based on:
a first light ray emanating from a right side of the object, the first light ray captured by the first light field sensor; and
a second light ray emanating from a left side of the object, the second light ray captured by the second light field sensor.

19. The method of claim 8, wherein the first light field emanating from the object is distinguished from the other light field emanating from the one or more other objects based on colors, intensities, or angular directions of light rays within the first light field and the other light field.

20. The method of claim 1, wherein the first light field emanating from the object is distinguished from the other light field emanating from the one or more other objects based on locations of origination of the first light field and the other light field.

* * * * *